Patented Feb. 12, 1935

1,990,996

UNITED STATES PATENT OFFICE 1,990,996

ADHESIVE

Julian Y. Malone, Milwaukee, Wis.

No Drawing. Application April 5, 1933,
Serial No. 664,555

3 Claims. (Cl. 134—17)

This invention appertains to a composition of matter and method of making the same, and more particularly to a new and improved adhesive compound, and is a continuation in part and a substitution for my prior application entitled Adhesive, filed September 8, 1931, Serial No. 561,704.

The primary object of my present invention is to produce a colorless transparent adhesive in which no solvent or liquids are used, and in which rubber is one of its main ingredients.

Various adhesive compositions in which rubber is used as one of the ingredients have heretofore been discovered, patented and used commercially for cementing, taping or securing glass, celluloid, or other transparent substances together, but to my knowledge, no cements, tapes or adhesives, in which rubber was one of the ingredients, has been used or sold that were transparent or even approached a neutral in color.

It is therefore another prime object of my invention to provide an adhesive containing rubber as one of its main ingredients which will be transparent, and which can be successfully used for connecting glass, celluloid, or other transparent substances together, the adhesive being particularly useful for attaching celluloid frost shield to the windshields of automobiles or glass frost shields to windshields, window panes and for securing glass tops on furniture, etc.

A further important object of my invention is to provide an adhesive which can be manufactured in the form of a tape of a transparent nature having an adhesive face on opposite sides, or which is a pure adhesive throughout its entire thickness.

A still further salient object of my invention is the provision of a novel method of producing the adhesive so as to render the same transparent and to give the same the proper adhesiveness.

A still further object of my invention is to provide a transparent adhesive which will be efficient in use, one that will be simple and easy to produce, and one which can be placed upon the market at a reasonable cost.

With these objects in mind, and without intention to limit the scope of the invention more than is required by the prior art, the invention briefly stated consists in an intermixture of rubber in a large proportion, and the balance in some resin, gum, polymerized products of hydrocarbons, or waxes.

In carrying out my invention, the adhesive composition may be prepared utilizing the following formula:

Rubber _____ 100 lbs.
Polymerized product of resin_____ 1 to 5 lbs.

There are a number of different kinds of rubber gums that can be used to produce my transparent adhesive, but the one found most successful is that called first latex, which is one of the group of the *Herva brasiliensis*. Other rubbers of this group which can be used are smoke sheet, brown crepe, amber crepe, page crepe, fine para, and coarse para.

The resin above referred to can be considered as Para-Coumarone (C$_6$H$_4$ CHOCH). This is a polymerized product of resin commercially known as "Cumar", the same being a polymerized product of coal tar derivatives.

In carrying out my invention, the rubber is prepared by milling the same to a plasticity reading of three, in accordance with the practice in rubber laboratories, with the Goodrich plastometer. The milled rubber is allowed to stand for twenty-four hours. The rear rolls of the mill preferably have a temperature of 140 to 160 degrees Fahrenheit.

After the milled rubber has aged for twenty-four hours, the rubber is milled again on a clean mill for approximately ten minutes. The resin is then added to this rubber. After the resin has been added, the mixture is then milled fifteen minutes longer with the use of the appropriately heated rolls. This compound is now allowed to cool and to age for another twenty-four hours. At the end of this time, the compound is then re-milled for an additional twenty-five minutes and is then finally run through a colander into the holland sheeting; that is, suitable sheeting to protect each side.

It is obvious that to produce my adhesive the rubber is milled and re-milled, which adds adhesiveness to the composition.

Other formulas can be used, and the following are some of the different examples:—

1. Rubber, 100 pounds
   Gums, 1 to 5 pounds

The following are specific examples of gums which can be used in the above formula; coroid gum; camphor gum; and dammar gum.

2. Rubber, 100 pounds
   Wax, 1 to 5 pounds

The following are specific examples of wax which can be used in the above formula: paraffin wax and beeswax.

3. Rubber, 100 pounds
   Resins (natural), 1 to 5 pounds.

Resin in the above formula can be considered as the natural resin obtained from pine trees.

4. Rubber, 100 pounds
   Hydro-carbons, and their derivatives, 1 to 5 pounds.

The hydro-carbons in the above formula are used in their broad sense, but an example of the same is Cumar.

While in all of the examples, I have given the amount of the rubber as 100 pounds, this can be varied within certain limitations, such as from 90 to 100 pounds.

In the above examples, certain specific substances have been mentioned, but it is to be understood that various resins, waxes, gums, etc., that have a refractive index capable of being mixed with raw rubber and producing a transparent compound, can be used.

While I have described a specific process for manufacturing my transparent adhesive, it should be understood that variations in the plasticity and also in details of processing may be varied. It may be desirable not to manipulate until the plastometer is reading 3, also it may not be desirable to mill, calender, age, etc., exactly as stated in the example given, for processing must vary, depending upon the color and other properties of the rubber and other materials, such as resin used in a given mixture.

The invention is to include not only a homogeneous mixture, but any combination of the ingredients. For example, a solution of mastic of proper adhesive qualities might be applied to the surface of the prepared rubber sheeting and allowed to dry to the point where the desired tack is present, and then covered with holland cloth. Also, it may be found desirable to apply a solid layer of the adhesive mixture to both sides of a thin sheet or strip of a non-adhesive material, thus making a laminated product.

It is to be understood that the raw rubber referred to in my composition is native or raw rubber, and this rubber is utilized in an unvulcanized condition.

Having thus described my invention, what I claim as new is:

1. The method of making a transparent and substantially colorless adhesive which consists in first milling raw rubber to a plasticity; allowing the rubber to age; re-milling the rubber and then adding a resin therein, then milling the mixture with heated rolls; then aging the milled mixture and finally re-milling the mixture and running the same into solid, pliable sheets.

2. The method of making a transparent substantially colorless adhesive, which consists in first milling a batch of raw-milled rubber to a plasticity reading of three with the Goodrich plastometer; allowing the milled batch of rubber to stand and age for twenty-four hours, re-milling the batch of rubber on a clean mill for approximately ten minutes and then adding a small quantity of resin thereto; then milling the mixture for a period of at least fifteen minutes; allowing the mixture to cool and age for twenty-four hours; and finally re-milling the mixture for an additional twenty-five minutes and running the same into sheets.

3. The method of making a transparent and substantially colorless adhesive which may be dissolved in a solvent, which consists in, first, milling raw rubber to a plasticity; allowing the milled rubber to age; re-milling the rubber and then adding a substance thereto having a refracted index compatible therewith for increasing the tackiness of the rubber; then, milling the mixture; then, re-aging the milled mixture; and, finally, re-milling the mixture.

JULIAN Y. MALONE.